(12) United States Patent
McKean et al.

(10) Patent No.: US 8,924,646 B2
(45) Date of Patent: Dec. 30, 2014

(54) METHODS FOR MANAGING DATA MOVEMENT AND DESTAGING DATA IN A MULTI-LEVEL CACHE SYSTEM UTILIZING THRESHOLD VALUES AND METADATA

(75) Inventors: Brian D. McKean, Longmont, CO (US); Donald R. Humlicek, Wichita, KS (US); Timothy R. Snider, Derby, KS (US)

(73) Assignee: LSI Corporation, San Jose, CA (US)

( * ) Notice: Subject to any disclaimer, the term of this patent is extended or adjusted under 35 U.S.C. 154(b) by 838 days.

(21) Appl. No.: 12/899,746

(22) Filed: Oct. 7, 2010

(65) Prior Publication Data

US 2012/0089782 A1    Apr. 12, 2012

(51) Int. Cl.
*G06F 12/12* (2006.01)
*G06F 12/08* (2006.01)

(52) U.S. Cl.
CPC ........ *G06F 12/0804* (2013.01); *G06F 12/0866* (2013.01); *G06F 12/0897* (2013.01)
USPC .......................................... 711/122; 711/133

(58) Field of Classification Search
USPC .......................................... 711/122, 133, 143
See application file for complete search history.

(56) References Cited

U.S. PATENT DOCUMENTS 6,295,582 B1 *   9/2001   Spencer ......................... 711/135
6,412,045 B1 *   6/2002   DeKoning et al. ............. 711/135
6,728,837 B2 *   4/2004   Wilkes et al. .................. 711/133
7,421,562 B2     9/2008   Bhatt et al.
7,526,614 B2     4/2009   van Riel

FOREIGN PATENT DOCUMENTS

WO    WO2009088194 A3    7/2009

OTHER PUBLICATIONS

Varma et al, "Destaging Algorithms for Disk Arrays with Non-Volatile Caches," Proceedings 22nd Annual International Symposium on Computer Architecture, Jun. 22-24, 1995, pp. 83-95.*

* cited by examiner

*Primary Examiner* — Sanjiv Shah
*Assistant Examiner* — Glenn Gossage
(74) *Attorney, Agent, or Firm* — Suiter Swantz pc llo

(57) ABSTRACT

A method for managing data movement in a multi-level cache system includes selecting at least one outgoing data block from a primary cache when an unallocated space of the primary cache has reached a minimum threshold, initiating a de-stage process for de-staging the outgoing data block, and terminating the de-stage process when the unallocated space has reached an upper threshold. The de-stage process includes storing the outgoing data block in a secondary cache when a cache hit has occurred before. The cache hit may be an actual cache hit or a "ghost" cache hit wherein only metadata is stored in the secondary cache. A method for de-staging an outgoing data block from a higher level cache which includes storing an outgoing data block in a lower level cache when a cache hit rate satisfies a predetermined condition and storing metadata in the lower level cache is also disclosed.

20 Claims, 3 Drawing Sheets

METHODS FOR MANAGING DATA MOVEMENT AND DESTAGING DATA IN A MULTI-LEVEL CACHE SYSTEM UTILIZING THRESHOLD VALUES AND METADATA

TECHNICAL FIELD

The present invention relates to the field of electronic data storage and particularly to a method for managing and tuning data movement between caches in a multi-level storage controller cache.

BACKGROUND

A cache is a component that may improve performance by storing data such that future requests for that data can be served faster. The Least Recently Used (LRU) algorithms are in common use for managing which information stays in the caches and which information is discarded to allow cache spaces to be recycled for use with newer information. LRU lists may be used with hash tables to find data and free lists to manage unallocated cache space. One issue that needs to be managed is when the free list becomes depleted and additional cache spaces must be freed in order to have resources available to handle new requests. For example, this may be handled by a recycle operation that is initiated when the number of elements on the free list drops below a certain threshold. A task may be initiated to remove some number of entries from the LRU queue and reuse the cache space allocated thereto by placing the entries on the free queue. This process may proceed until another threshold is reached which stops the process.

A multi-level cache system may include smaller faster caches backed up by larger slower caches. In a multi-level cache system, fast memory technologies (e.g., dynamic random access memory (DRAM)) may be utilized to implement the primary cache. Flash technology may be utilized as a secondary cache to provide much larger cache capacities. Algorithms may be defined to determine when to move data from the primary cache and to the secondary flash cache.

SUMMARY

Accordingly, an embodiment of the present invention is directed to a method for managing data movement in a multi-level cache system, where the multi-level cache system has a primary cache and a secondary cache. The method may comprise determining whether an unallocated space of the primary cache has reached a minimum threshold; selecting at least one outgoing data block from the primary cache when the primary cache has reached the minimum threshold; initiating a de-stage process for de-staging the at least one outgoing data block from the primary cache; and terminating the de-stage process when the unallocated space of the primary cache has reached an upper threshold. The de-stage process may further comprise determining whether a cache hit has occurred before in the secondary cache; storing the at least one outgoing data block in the secondary cache when the cache hit has occurred before in the secondary cache; generating and storing metadata regarding the at least one outgoing data block; and deleting the at least one outgoing data block from the primary cache.

A further embodiment of the present invention is directed to a method for de-staging an outgoing data block from a higher level cache in a multi-level cache system. The method may comprise determining a cache hit rate associated with a lower level cache in the multi-level cache system; storing the outgoing data block in the lower level cache when the cache hit rate satisfies a predetermined condition; generating metadata regarding the outgoing data block; storing the metadata regarding the outgoing data block in the lower level cache; and deleting the outgoing data block from the higher level cache.

An additional embodiment of the present invention is directed to a multi-level cache system. The multi-level cache system may comprise a higher level cache, a lower level cache communicatively coupled with the higher level cache, and a cache controller configured for de-staging an outgoing data block from the higher level cache. The de-staging may further comprise determining a cache hit rate associated with the lower level cache; storing the outgoing data block in the lower level cache when the cache hit rate satisfies a predetermined condition; generating metadata regarding the outgoing data block; storing the metadata regarding the outgoing data block in the lower level cache; and deleting the outgoing data block from the higher level cache.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Various cache algorithms may be defined to determine when to move data from the primary cache and to the secondary flash cache in a multi-level cache system. In a simple algorithm, for example, data may be placed into a secondary cache as part of processing each read request to a storage system. This simple algorithm has the disadvantage of consuming processor cycles as part of the input/output (I/O) path. In addition, if a write occurs to the same data while it still resides in the primary cache, the data in the secondary cache will need to be discarded, thereby wasting the work of moving the data to the secondary cache in the first place.

The present invention is directed to a method for managing and tuning data movement between caches in a multi-level cache system. Furthermore, the method of the present invention utilizes metadata to track the number of hits to data sets that have been removed from the primary cache. Based on the metadata, the method of the present invention may determine whether to stage some of the data sets removed from the primary cache in the secondary cache in order to improve performance.

Figure 1:
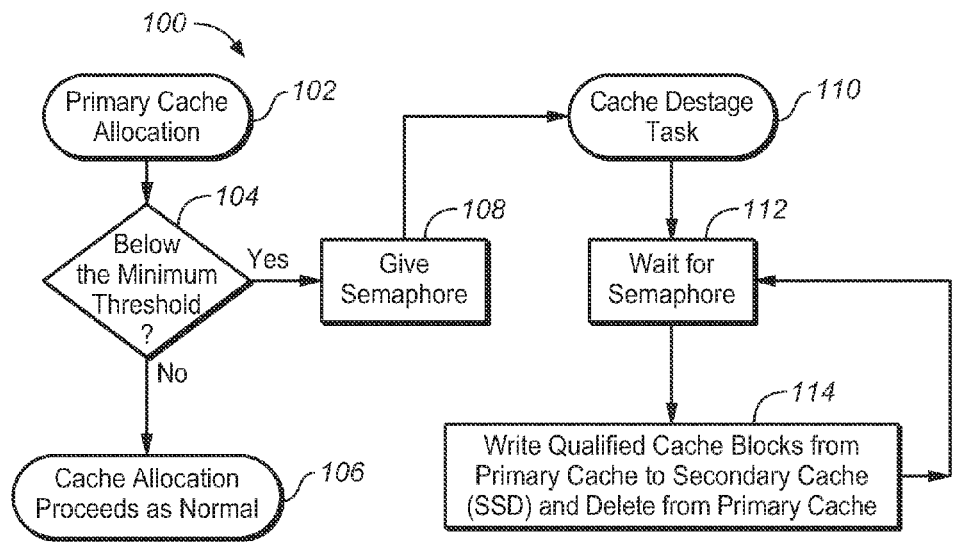
FIG. 1 is an illustration depicting a data movement algorithm between a primary cache and a secondary cache.

In one embodiment, data is placed into a secondary cache when the primary cache is full and needs to recycle cache spaces for reuse. Referring to FIG. 1, an illustration depicting a data movement algorithm 100 for moving data between the primary cache and the secondary cache is shown. When the primary cache is allocated in step 102, a decision step 104 is invoked to determine whether the unallocated cache space of the primary cache (managed using a primary cache free list, e.g.) has reached its minimum threshold. If the minimum threshold has not been reached, the cache allocation may proceed as normal as indicated in step 106. However, if the minimum threshold has been reached, the primary cache may need to recycle some of the allocated spaces for reuse. The recycling process 110 (may also be referred to as cache de-stage task or process) may start when a semaphore (or any type of access control mechanism) is given or released in step 108.

The recycling process 110 may recycle the least recently used cache blocks (allocation units) from the primary cache until the unallocated cache space of the primary cache is increased in size to its upper threshold (at which point the semaphore is no longer released and the recycling process 110 goes to a waiting state 112). In one implementation, in step 114, qualified (least recently used or LRU, e.g.) cache blocks of the primary cache are moved or written to the secondary cache (which may be a solid state drive or SSD), and then the space on the primary cache is freed for reuse. It is contemplated while the least recently used algorithm is referenced in the present invention, it is merely exemplary and that various other cache algorithms (e.g., least frequently used, adaptive replacement cache or the like) may be utilized for selecting the cache blocks to be de-staged without departing from the spirit and scope of the present invention.

Since the secondary cache provides a faster access compared to hard disk drives, the primary cache recycling process may be made adaptive to adjust to access patterns. For instance, if there are many cache hits in the secondary cache (e.g., the number of cache hits exceeds a certain threshold), then the size of unallocated cache space of the primary cache may be increased (e.g., by increasing the minimum threshold for the unallocated space of the primary cache). Such increases may decrease potential wait time for a process with a secondary cache hit to acquire the primary cache space in order to complete its operation. Conversely, if there are many primary cache hits, then the size of unallocated cache space of the primary cache may be decreased/minimized (e.g., by decreasing the minimum threshold for the unallocated space of the primary cache) in order to increase the probability of additional primary cache hits.

It is contemplated that the data movement algorithm may also be adjusted so that if there are very few secondary cache hits, algorithms for selecting data to transfer from primary to secondary cache may be adjusted to only move a percentage of the least recently used cache blocks from the primary cache. Since some workloads will at times not benefit from the use of a secondary cache, the cache can detect the workload in progress and only cache a portion of the data in order to decrease resource utilization in the non-beneficial extra movement of data.

In one embodiment, as an effort to avoid caching unnecessarily in the secondary cache, metadata is utilized to track/monitor the number of hits to data blocks that have been removed from the primary cache. Metadata may be utilized to track a data block removed from the primary cache regardless of whether it is de-staged to the secondary cache or simply discarded from the primary cache (i.e., its data content is not moved to the secondary cache). In this manner, the method of the present invention may determine which data blocks to move to the secondary cache so that the overall system performance may be improved. This may be accomplished by: tracking metadata for data blocks removed from the primary cache regardless of whether they are de-staged or simply discarded; determining if a performance increase from potential hits justifies the cost of de-staging (moving) data blocks to the secondary cache; and adaptively enabling or disabling de-staging of the data blocks to secondary cache to maximize system performance.

For example, the multi-level cache system may initially operate as illustrated in FIG. 1 (described above), wherein the least recently used data blocks are moved to the secondary cache as space is needed in the primary cache. However, after the system has de-staged some data blocks to the secondary cache without generating any cache hit, the cache system may stop de-staging data blocks to the secondary cache (i.e., discarding data blocks from the primary cache without moving them to the secondary cache, thus avoiding caching unnecessarily). The cache system may, however, continue tracking the metadata for the discarded data blocks as if actual data movement had occurred. The metadata for such discarded data blocks may indicate that the associated data is not valid.

In this manner, the secondary cache may track which data block would have been in the cache without actually moving the data. The data blocks being tracked without their actual data contents may be referred to as "ghost" cache (only metadata is saved and tracked but not the actual data). If a cache hit occurs on a "ghost" cache, then the cache system may begin to move actual data contents to the secondary cache again. It is noted that "ghost" cache hits are only hits on the metadata, the actual data content is not in the secondary cache and must be retrieved from the storage behind the cache (e.g., from the hard drives or the like).

Figure 2:
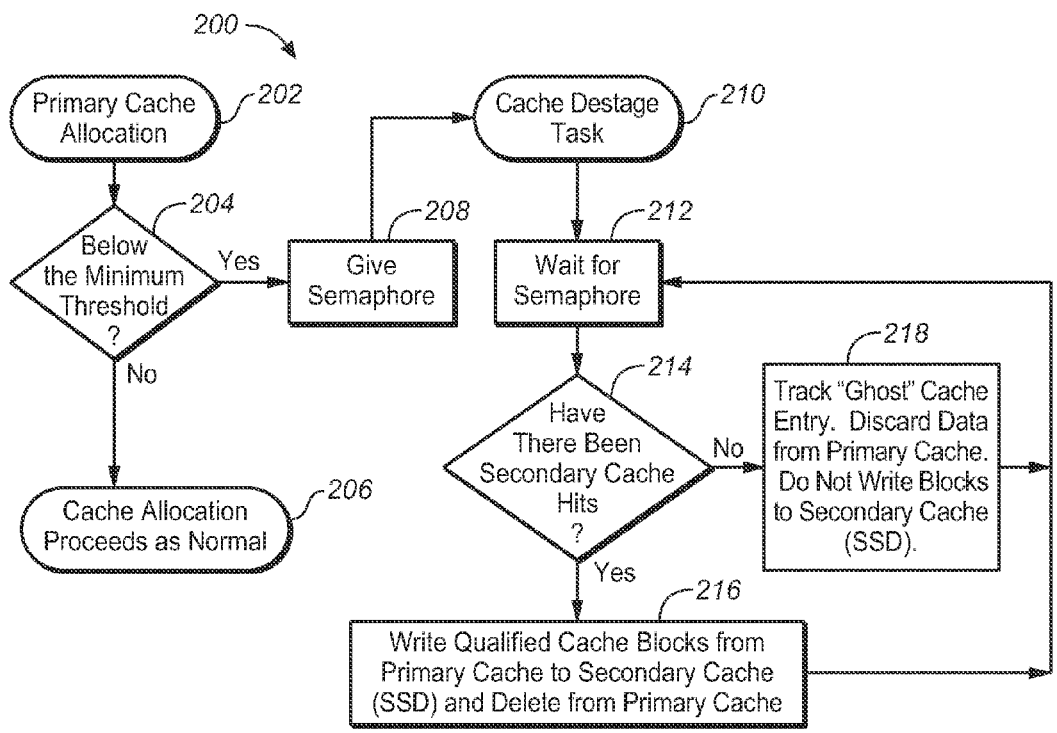
FIG. 2 is an illustration depicting another data movement algorithm between a primary cache and a secondary cache.

Referring to FIG. 2, an illustration depicting data movement algorithm 200 between the primary cache and the secondary cache is shown. When the primary cache is allocated in step 202, a decision step 204 is invoked to determine whether the unallocated cache space of the primary cache has reached its minimum threshold. If the minimum threshold has not been reached, the cache allocation may proceed as normal as indicated in step 206. However, if the minimum threshold has been reached, the primary cache may need to recycle some of the allocated spaces for reuse. The recycling process 210 may start when a semaphore (or any type of access control mechanisms) is given or released in step 208.

The recycling process 210 may recycle the least recently used cache blocks from the primary cache until the unallocated cache space of the primary cache is increased in size to its upper threshold (at which point the semaphore is no longer released and the recycling process 210 goes to the waiting state 212). In one implementation, metadata is utilized to track/monitor the number of hits that have occurred on the secondary cache as previously described. If the metadata indicates that there have been secondary cache hits (determined in step 214), then in step 216, qualified (LRU, e.g.) cache blocks of the primary cache may be moved or written to the secondary cache (which may be a solid state drive or SSD), and deleted from the primary cache. However, if the metadata indicates that there has been no secondary cache hit for a given period of time and/or a given number of input/output (I/O) operations, then in step 218, only the metadata of the least recently used cache blocks of the primary cache ("ghost" cache entry) may be tracked without moving the actual data content to the secondary cache. Once the metadata has been updated, the data content of the least recently used cache blocks of the primary cache may be discarded from the primary cache.

Figure 3:
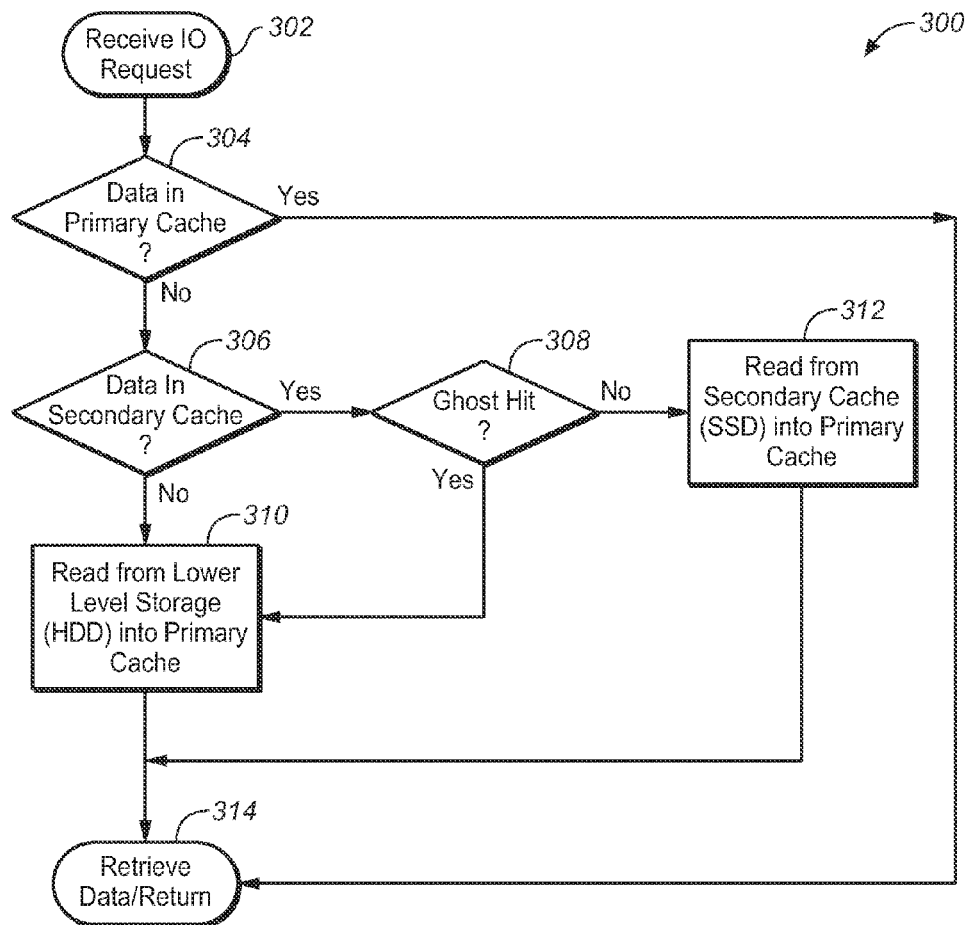
FIG. 3 is a flow diagram depicting a data accessing method in a multi-level cache system supporting the data movement algorithm depicted in FIG. 2.

Referring to FIG. 3, a flow diagram depicting a data accessing method 300 in a multi-level cache system supporting "ghost" cache is shown. Upon receiving an I/O request in step 302, a decision step 304 is invoked to determine whether the data requested resides in the primary cache. If the data requested resides in the primary cache, then the I/O request may retrieve the data from the primary cache and return as indicated in step 314. However, if the data requested does not reside in the primary cache, then a decision step 306 is invoked to determine whether the data requested resides in the secondary cache. If the data requested does not reside in the secondary cache, then the I/O request may retrieve the data from a lower level storage unit (e.g., a hard disk drive (HDD) or the like) in step 310. Furthermore, the data retrieved from the lower level storage unit may be placed into the primary cache.

If the decision step 306 determines that the data requested resides in the secondary cache (a cache hit in the secondary cache), this may be a result of either an actual cache hit or a "ghost" cache hit. Therefore, a decision step 308 may be invoked to determine whether the actual data content of the requested data resides in the secondary cache, or if only the metadata of the requested data is saved but not the actual data content (a "ghost" hit). If it is determined that only the metadata of the requested data is stored but not the actual data content (a "ghost" hit), then the I/O request may retrieve the data from the lower level storage unit in step 310. Otherwise, if the actual data content of the requested data indeed resides in the secondary cache (an actual hit, not a "ghost" hit), the I/O request may retrieve the data from the secondary cache in step 312. Similarly, the data retrieved from the secondary cache may also be placed into the primary cache.

It is understood that the method of the present invention may be utilized in a multi-level cache system for a stand-alone computer system or a storage network. It is contemplated that the cache system may not be limited to two levels. For example, the "ghost" caching method described above may be utilized to manage data movements between a secondary cache and a third level cache in a three-level cache system without departing from the spirit and scope of the present invention.

It is also contemplated that the "ghost" caching technology may be enhanced with monitoring activity in the primary cache as well. For example, the ghost cache may monitor cache hits and other statistics from the primary cache and place data associated with those hits in the ghost cache. Such statistics may include, but are not limited to, the number of times a LBA (or a range of LBAs) is accessed, the number of primary cache hits, hit rate intervals or the like. Once minimum thresholds for these statistics are reached, data may be moved from the primary to the secondary cache. Furthermore, the ghost cache may be utilized to determine which data should be kept in the secondary cache and which can be discarded when the secondary cache is full and other data needs to be stored in it. Utilizing the "ghost" caching technology allows a storage subsystem to be more responsive to host requests by freeing up resources used to de-stage data when that data is unlikely to be accessed again by the host. As a result, certain system resources may be freed and used for other processing purposes.

It is further contemplated that an alternative initialization mechanism for the secondary cache may start by not staging any data to the secondary cache. The storage system may use all secondary cache metadata as a "ghost" cache. In this manner, the storage system is configured to track hit statistics until it determines that system performance would benefit from caching some of the information in the secondary cache. At that time the storage system may start de-staging data as described earlier. The storage system may monitor usage of the secondary cache continuously and tune the amount of data de-staged to maximize the overall system performance.

Figure 4:
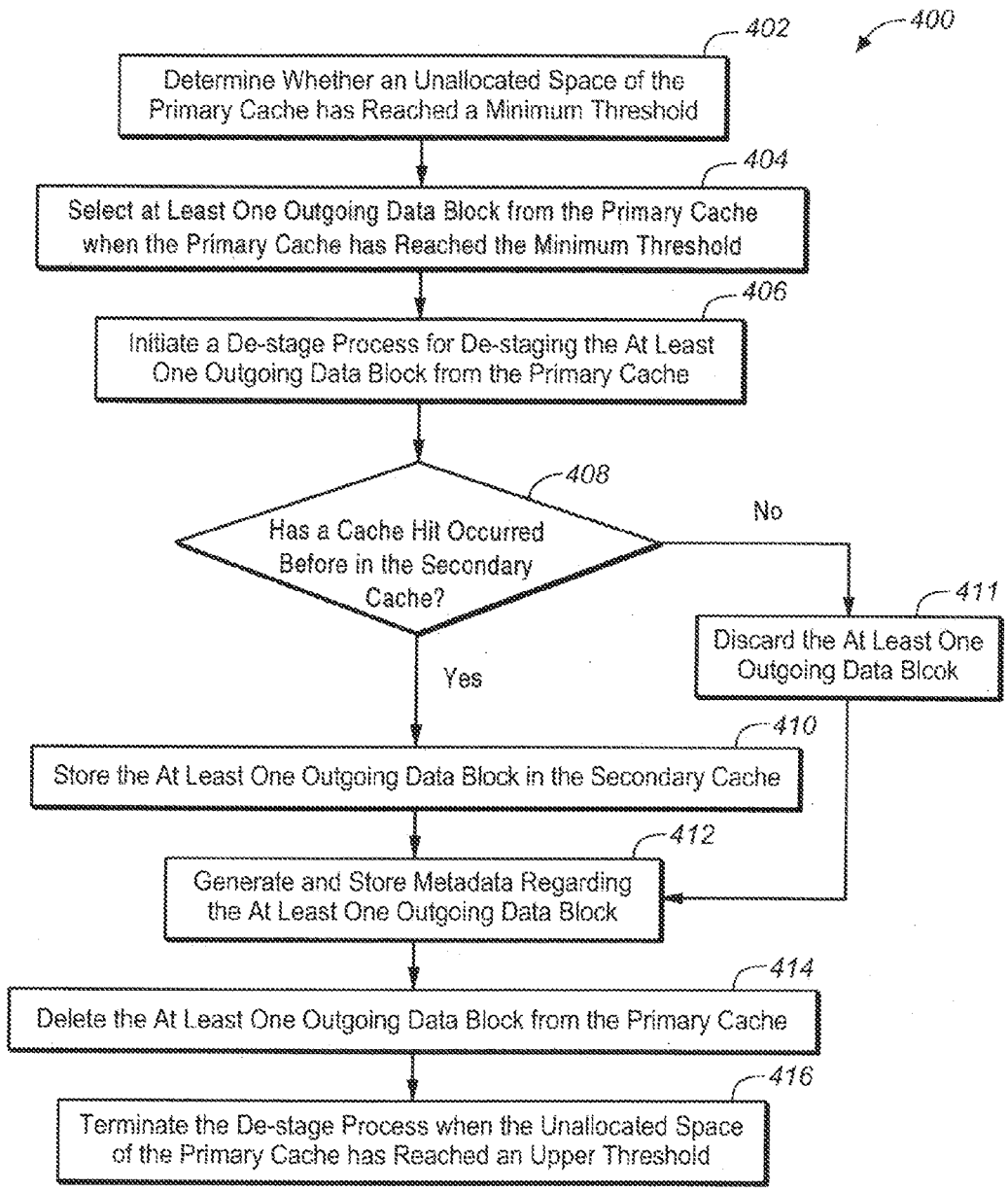
FIG. 4 is a flow diagram depicting a method for managing data movement in a multi-level cache system.

Referring to FIG. 4, a flow diagram depicting a method 400 for managing data movement in a multi-level cache system is shown. The multi-level cache system may include a primary cache and a secondary cache. In one embodiment, in step 402, it is determined whether an unallocated space of the primary cache has reached a minimum threshold. In step 404, at least one outgoing data block (allocation unit) is selected from the primary cache when the primary cache has reached the minimum threshold. The outgoing data block may be a cache block, a data set, or a unit of data that may be removed from the primary cache to free up some space.

A de-stage process for de-staging the at least one outgoing data block from the primary cache may be initiated in step 406. In one embodiment, the de-stage process is configured to avoid caching unnecessarily in the secondary cache as previously described. For example, the de-stage process may determine whether a cache hit has ever occurred before in the secondary cache in step 408. If a cache hit has occurred before in the secondary cache, the at least one outgoing data block may be stored in the secondary cache in step 410. However, if no cache hit has occurred before in the secondary cache, the at least one outgoing data block may simply be discarded. In step 412, metadata regarding the at least one outgoing data block is generated and stored/tracked regardless of whether the at least one outgoing data block is to be stored in the secondary cache or is discarded. Then, in step 414, the at least one outgoing data block is deleted from the primary cache to free up the space in the primary cache. The de-stage process may repeat one or more times until the unallocated space of the primary cache has reached an upper threshold, at which point the de-stage process is terminated in step 416.

As described previously, a cache hit occurring in the secondary cache may be an actual cache hit or a ghost cache hit. Furthermore, instead of determining whether a cache hit has ever occurred in the secondary cache, the determination may be more limited. For example, step 408 may be configured to determine whether a cache hit has occurred in the secondary cache during a predetermined period of time prior to the de-stage process. In another example, step 408 may be configured to determine whether a cache hit has occurred in the secondary cache for a predetermined number of input/output operations prior to the de-stage process.

Figure 5:
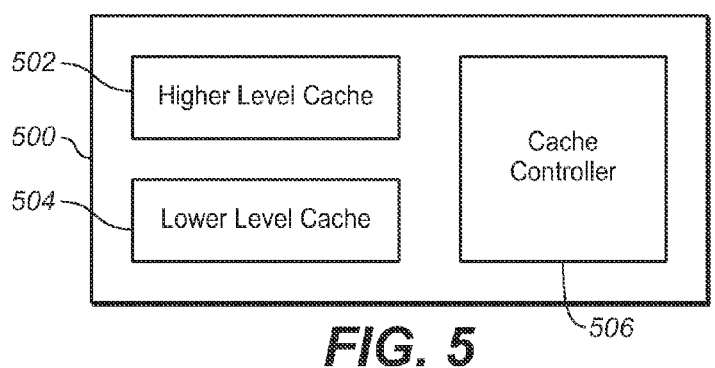
FIG. 5 is a block diagram depicting a multi-level cache system.

Referring to FIG. 5, a block diagram depicting a multi-level cache system 500 is shown. The multi-level cache system 500 may include a higher level cache 502, a lower level cache 504 and a cache controller 506. The cache controller 506 may be configured for de-staging an outgoing data block from the higher level cache 502.

In one embodiment, the cache controller 506 is configured to determine a cache hit rate associated with the lower level cache. The cache hit rate may indicate a frequency of cache hit(s) occurring in the lower level cache 504, or may simply indicate a number of cache hit(s) occurring in the lower level cache 504. If the cache hit rate satisfies a predetermined condition, the cache controller 506 may store the outgoing data block in the lower level cache 504. The cache controller 506 is further configured to generate and store/track metadata regarding the outgoing data block as well as delete the outgoing data block from the higher level cache 502. As described previously, a cache hit occurring in the lower level cache 504 may be an actual cache hit or a ghost cache hit. In one embodiment, the predetermined condition is satisfied when at least one cache hit occurred before in the lower level cache 504.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, compact disk-read only memory (CD-ROM), magnetic disk, hard disk drive, magneto-optical disk, read only memory (ROM), random access memory (RAM), erasable programmable read only memory (EPROM), electrically erasable programmable read only memory (EEPROM), magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A method for managing data movement in a multi-level cache system, the multi-level cache system having a primary cache and a secondary cache, the method comprising:
   initializing the secondary cache, including:
      configuring the secondary cache to not stage any data initially; and
      utilizing all metadata from the secondary cache as a ghost cache;
   determining whether an unallocated space of the primary cache has reached a minimum threshold;
   selecting at least one outgoing data block from the primary cache when the primary cache has reached the minimum threshold;
   initiating a de-stage process for de-staging the at least one outgoing data block from the primary cache, the de-stage process comprising:
      generating metadata regarding the at least one outgoing data block;
      determining a number of cache hits that have occurred before in the secondary cache, including at least one of:
         an actual cache hit that has occurred in the secondary cache, wherein a data block for the actual cache hit is stored in the secondary cache; and
         a ghost cache hit that has occurred in the secondary cache, wherein only metadata regarding the data block for the ghost cache hit is stored in the secondary cache;
      storing only the metadata regarding the at least one outgoing data block in the secondary cache when the number of cache hits that have occurred before in the secondary cache is below a predetermined threshold;
      storing the metadata regarding the at least one outgoing data block and the at least one outgoing data block in the secondary cache only under a condition when the number of cache hits that have occurred before in the secondary cache exceeds the predetermined threshold; and
      deleting the at least one outgoing data block from the primary cache; and
   terminating the de-stage process when the unallocated space of the primary cache has reached an upper threshold.

2. The method of claim 1, further comprising:
   increasing the minimum threshold for the unallocated space of the primary cache when a number of cache hits occurring in the secondary cache exceeds a predetermined threshold.

3. The method of claim 1, further comprising:
   decreasing the minimum threshold for the unallocated space of the primary cache when a number of cache hits occurring in the primary cache exceeds a predetermined threshold.

4. The method of claim 1, wherein determining a number of cache hits that have occurred before in the secondary cache comprises:
   determining a number of cache hits that have occurred in the secondary cache during a predetermined period of time prior to the de-stage process.

5. The method of claim 1, wherein determining a number of cache hits that have occurred before in the secondary cache comprises:
   determining a number of cache hits that have occurred in the secondary cache during a predetermined number of input/output operations prior to the de-stage process.

6. The method of claim 1, wherein selecting at least one outgoing data block from the primary cache comprises:
   selecting at least one least recently used (LRU) data block from the primary cache as the at least one outgoing data block.

7. The method of claim 1, wherein a semaphore is utilized for initiating and terminating the de-stage process.

8. A method, comprising:
   initializing a lower level cache in a multi-level cache system, said initializing the lower level cache including:
      configuring the lower level cache to not stage any data initially; and
      utilizing all metadata from the lower level cache as a ghost cache;
   determining a number of cache hits that have occurred before in the lower level cache in the multi-level cache system, wherein a cache hit in the lower level cache includes at least one of:
      an actual cache hit that occurred in the lower level cache, wherein a data block for the actual cache hit is stored in the lower level cache; and
      a ghost cache hit that occurred in the lower level cache, wherein only metadata regarding the data block for the ghost cache hit is stored in the lower level cache;

generating metadata regarding an outgoing data block to be de-staged from a higher level cache in the multi-level cache system;

storing only the metadata regarding the outgoing data block in the lower level cache when the number of cache hits that have occurred before in the secondary cache is below a predetermined threshold;

storing the metadata regarding the outgoing data block and the outgoing data block in the lower level cache only under a condition when the number of cache hits that have occurred in the lower level cache exceeds the predetermined threshold and deleting the outgoing data block from the higher level cache.

9. The method of claim 8, wherein determining the number of cache hits that have occurred in the lower level cache comprises:

determining the number of cache hits that have occurred in the lower level cache during a predetermined period of time.

10. The method of claim 8, wherein determining the number of cache hits that have occurred in the lower level cache comprises:

determining the number of cache hits that have occurred in the lower level cache during a predetermined number of input/output operations.

11. The method of claim 8, further comprising:

determining whether an unallocated space of the higher level cache has reached a minimum threshold; and selecting the outgoing data block from the higher level cache when the higher level cache has reached the minimum threshold.

12. The method of claim 11, further comprising:

increasing the minimum threshold for the unallocated space of the higher level cache when a number of cache hits occurring in the lower level cache exceeds a predetermined threshold.

13. The method of claim 11, further comprising:

decreasing the minimum threshold for the unallocated space of the higher level cache when a number of cache hits occurring in the higher level cache exceeds a predetermined threshold.

14. A multi-level cache system, comprising:

a higher level cache;

a lower level cache, the lower level cache communicatively coupled with the higher level cache, the lower level cache being initialized to not stage any data, and all metadata from the lower level cache is utilized as a ghost cache; and a cache controller, the cache controller configured for de-staging an outgoing data block from the higher level cache, wherein, in de-staging the outgoing data block from the higher level cache, said cache controller is further configured to:

determine a number of cache hits that have occurred before in the lower level cache, wherein a cache hit in the lower level cache includes at least one of:

an actual cache hit that occurred in the lower level cache, wherein a data block for the actual cache hit is stored in the lower level cache; and a ghost cache hit that occurred in the lower level cache, wherein only metadata regarding the data block for the ghost cache hit is stored in the lower level cache;

generate metadata regarding the outgoing data block;

store only the metadata regarding the outgoing data block in the lower level cache when the number of cache hits that have occurred before in the secondary cache is below a predetermined threshold;

store the metadata regarding the outgoing data block and the outgoing data block in the lower level cache when the number of cache hits that have occurred in the lower level cache exceeds the predetermined threshold and delete the outgoing data block from the higher level cache.

15. The multi-level cache system of claim 14, wherein in determining the number of cache hits that have occurred in the lower level cache, said cache controller is further configured to determine the number of cache hits that have occurred in the lower level cache during at least one of: a predetermined period of time and a predetermined number of input/output operations.

16. The multi-level cache system of claim 14, wherein said cache controller is further configured to:

determining whether an unallocated space of the higher level cache has reached a minimum threshold; and selecting the outgoing data block from the higher level cache when the higher level cache has reached the minimum threshold.

17. The multi-level cache system of claim 16, wherein said cache controller is further configured to:

initiate de-staging the outgoing data block from the higher level cache when the higher level cache has reached the minimum threshold.

18. The multi-level cache system of claim 16, wherein said cache controller is further configured to:

terminate de-staging the outgoing data block when the unallocated space of the higher level cache has reached an upper threshold.

19. The multi-level cache system of claim 16, wherein said cache controller is further configured to:

increase the minimum threshold for the unallocated space of the higher level cache when a number of cache hits occurring in the lower level cache exceeds a predetermined threshold.

20. The multi-level cache system of claim 16, wherein said cache controller is further configured to:

decrease the minimum threshold for the unallocated space of the higher level cache when a number of cache hits occurring in the higher level cache exceeds a predetermined threshold.

* * * * *